United States Patent [19]

Hanazono et al.

[11] Patent Number: 5,109,311
[45] Date of Patent: Apr. 28, 1992

[54] MAGNETIC DISK DEVICE AND METHOD OF RECORDING/RETRIEVING INFORMATION

[75] Inventors: Masanobu Hanazono; Shinji Narishige, both of Mito; Yutaka Sugita, Tokorozawa; Hiroshi Fukui, Hitachi; Hirotsugu Fukuoka, Sendai; Hajime Aoi, Tachikawa; Masayuki Katsumoto, Kodaira; Takuji Ogawa; Jun Naruse, both of Odawara; Yokuo Saitoh, Kanagawa, all of Japan

[73] Assignee: Hitachi, Ltd., Tokyo, Japan

[21] Appl. No.: 700,095

[22] Filed: May 6, 1991

Related U.S. Application Data

[63] Continuation-in-part of Ser. No. 326,383, Mar. 21, 1989, abandoned.

[30] Foreign Application Priority Data

Mar. 23, 1988 [JP] Japan .................... 63-67428
Nov. 11, 1988 [JP] Japan .................... 63-283669

[51] Int. Cl.$^5$ .................... G11B 5/23; G11B 5/127
[52] U.S. Cl. .................... 360/119; 360/110; 360/126; 360/122
[58] Field of Search .................... 360/119, 97.01–97.03, 360/110, 122, 126–127

[56] References Cited

U.S. PATENT DOCUMENTS

| | | | |
|---|---|---|---|
| 4,432,025 | 2/1984 | Grogan | 360/48 X |
| 4,742,413 | 5/1988 | Schewe | 360/119 |
| 4,799,118 | 1/1989 | Yamada et al. | 360/119 |
| 4,951,166 | 8/1990 | Schewe | 360/119 X |

FOREIGN PATENT DOCUMENTS 57-210403 12/1982 Japan .
60-133501 7/1985 Japan .

OTHER PUBLICATIONS

J. Apply. Phys. 61(8), Apr. 15, 1987, American Institute of Physics, pp. 4157–4162, "Design and Fabrication of Thin-Film Heads Based on a Dry Process" by Hanazono et al.

Primary Examiner—Aristotelis Psitos
Assistant Examiner—Alfonso Garcia
Attorney, Agent, or Firm—Antonelli, Terry, Stout & Kraus

[57] ABSTRACT

This invention provides a magnetic disk device having a total memory capacity of 30 giga bytes or more, or more desirably 30~40 giga bytes. The magnetic disk used in this magnetic disk device has a plane record density of 45~80 mega bits per square inch. The thin film magnetic head has a pole thickness ($P_T$), a magnetic flux density ($B_s$), a magnetic gap depth ($G_d$) and a record wavelenth ($\lambda$) which satisfy the formula $$G_d \leq 0.13\, P_T B_s(\lambda+4.3)-2.1.$$

The magnetic disk rotation means rotate the magnetic disk at a speed of 24 m per second or more.

38 Claims, 7 Drawing Sheets

Gd LARGE, MAG. FIELD WEAK

Gd SMALL, MAG. FIELD STRONG

Gd LARGE, MAG. FIELD WEAK

Gd SMALL, MAG. FIELD STRONG

MAGNETIC DISK DEVICE AND METHOD OF RECORDING/RETRIEVING INFORMATION

This application is a continuation-in-part of application Ser. No. 326,383, filed Mar. 21, 1989 now abandoned.

BACKGROUND OF THE INVENTION

1. Field of the Invention

This invention relates to a magnetic disk device and a method of recording/retrieving information into and from the magnetic disk device, and more particularly to a magnetic disk device adapted to be used as an external memory device for a computer, a thin film magnetic head and a magnetic disk equipped in the magnetic disk device and a method of writing/reading information by the use of the magnetic disk device.

2. Description of the Related Art

In accompany with the increase in the memory capacity of the computer, the memory capacity of the magnetic disk device has a tendency of being more and more increased.

As a conventional technique of the magnetic disk device, for example JP-A-60-133501 specification discloses recording the outer tracks and the inner tracks at the same line density by using a heat equipped with a plurality of head cores on one slider, for enabling recording of the outer tracks at a high record density similar to the inner tracks. JP-A-57-210403 specification discloses writing data into tracks on a disk at different frequency, thereby optimizing the capacity of each track and increasing the record density in the disk as a whole.

The above-mentioned prior art relates with the magnetic disc device each intends to increase the record density of the disk itself.

There has been known no proposal how a magnetic disk device should be constructed for increasing the memory capacity of the magnetic disk device as a whole.

SUMMARY OF THE INVENTION

An object of this invention is to clarify the construction to be provided as a magnetic disk device having a total memory capacity of not less than 30 giga bytes, preferably of 30~40 giga bytes, and to provide a magnetic disk device realizing such a memory capacity.

Another object of this invention is to provide a disk suitable to be loaded on a magnetic disk device having a memory capacity of 30 giga bytes or more.

Further object of this invention is to provide a thin film magnetic head suitable to be loaded in a magnetic disk device having a memory capacity of 30 giga bytes or more.

Yet further object of this invention is to provide a method of recording/retrieving information by such a magnetic disk device.

A magnetic disk device according to this invention is provided with a plurality of head disk assemblies mounting a plurality of magnetic disks on one rotation axis, has thin film magnetic heads for writing and reading information in and from the magnetic disk, and further has rotation means for a magnetic disk.

It is preferable that a magnetic disk has a plane record density of 45~80 mega bits per one square inch. This plane record density is preferably realized in range of the track density of 1500 tracks per inch (1500 TPI) or more or of the line record density of 30 kilo bits per inch (30 KbPI) or more.

It is preferable for a thin film magnetic head to have almost no or an extremely small magnetic gap depth between an upper and a lower magnetic core. Particularly, it is preferable to provide a thin film magnetic head which has no substantial magnetic gap depth and in which the gap immediately expands along the direction departing from the face opposing to the magnetic disk.

The maximum depth of the magnetic gap of thin film magnetic head varies with the pole thickness and the saturation magnetic flux density of a magnetic core, and the record wavelength. In the present invention, it is very desirable that the magnetic gap depth be defined by the following formula, $$G_d \leq 0.13\, P_T B_s (\lambda + 4.3) - 2.1$$

where
$G_d$: magnetic gap depth ($\mu$m)
$P_T$: pole thickness ($\mu$m)
$B_s$: saturation magnetic flux density (T)
$\lambda$: record wavelength ($\mu$m).

As the magnetic disk rotating means, it is preferable to provide one which can rotate the innermost track of the magnet disk at a peripheral speed of 24 m/sec or more.

This invention is based on an idea that for increasing the memory capacity of a magnetic disk device, it is necessary to increase the recording density of the disk.

For increasing the memory capacity of a magnetic disk device, it can be considered to increase the disk diameter, besides increasing the record density of the disk.

When the disk diameter is increased, however, the magnetic disk device becomes large. There arises a problem that an enlarged magnetic disk device can no longer be installed in a space where a conventional magnetic disk device has been installed.

Further, upon writing or reading data, the translation length of the arm mounting the thin film magnetic head becomes long, thereby lowering the transmission time of data. When the transmission time is to be reduced, the accuracy of accessing is degraded.

From the above, it is not desirable to increase the disk diameter as means for increasing the memory capacity.

This invention clarifies the structure of a magnetic disk device which can realize a memory capacity of 30 giga bytes or more without enlarging the magnetic disk device, nor lowering the transmission speed of data.

In the magnetic disk device, the diameters of disks generally used are in a range of about 8~11 inches.

The space for accommodating a magnetic disk device usually has such dimensions, as the length of one side of the bottom face being 0.5~1.5 m and the height being below 2 m.

Thus, more specifically, the structure of a magnetic disk device which uses disks of 8~11 inches in diameter, can be installed in a space having a length of one side of the bottom of 0.5~1.5 m and a height of 2 m or less, and can realize a memory capacity of 30 giga bytes or more.

In the present invention, the plane record density in a disk and the gap depth of a thin film magnetic head are very important items.

By making the plane record density of a disk 45 Mb/in² or more, a memory capacity of 30 giga bytes or more can be realized in the ranges of the above-mentioned disk diameter and the accommodation space.

By using a thin film magnetic head having almost no gap depth between the upper and the lower magnetic cores or having a gap depth of a value defined by the preceding formula or less, data writing/reading is made possible to a disk of the above-mentioned plane record density.

It is preferable that a disk will not have a linear record density of 50 KbPI or above and a track density of 3000 TPI or above, as far as possible. When the linear record density and/or the track density are selected too high, data of adjacent tracks may also be read out upon reading data from the disk by the thin film magnetic head, thereby increasing the noise. Such a problem of noise can be avoided when the linear record density is 50 KbPI or less and the track density is 3000 TPI or less.

According to this invention, it is preferable that a plurality of disk-shape magnetic disks are mounted on a rotation axis to constitute a head disk assembly, and that a plurality of such head disk assemblies are provided to constitute a magnetic disk device. In case where the number of disks in a head disk assembly is of the order of ten, it is possible to accommodate about eight head disk assemblies in an accommodation space having a side of bottom face of 0.5~1.5 m and a height of about 2 m, since the disk diameter is 8~11 inches.

When eight head disk assemblies are equipped, it is necessary for one head disk assembly to have a memory capacity of 3.8 giga bytes or more per one head disk assembly for realizing a total memory capacity of 30 giga bytes or more. When both the front and the rear surfaces of a disk are utilized for writing information, eight disks are provided for each head disk assembly, and 15 planes of the disks are used as record surfaces, the memory capacity per each plane is about 0.25 giga bytes or more. In the disk, the portion actually utilized for writing information is from the outer periphery to at most about 4 cm therefrom. For realizing the above-mentioned 0.25 giga bytes by using such a disk, it is sufficiently realizable by selecting a track density of 1500 tracks per inch and a line record density of 30 kilo bits per inch.

Even when the memory capacity of a magnetic disk device is increased, if a longer time is required for writing/reading information in accompany therewith, the merit of enlarged memory capacity is null or almost null. In accompany with increasing the capacity, it is required to speed-up the speed of writing/reading information, i.e. the data transmission speed. In a magnetic disk device having disks of a plane record density of 45~80 mega bits/in$^2$, it is preferable to select a data transmission speed of 4.5~6 mega bytes/sec, for realizing a memory capacity of 30~40 giga bytes. By arranging in these ways, it becomes possible to increase the memory capacity without delaying the information processing speed.

Here, the plane record density can be expressed by the product of the track density and the line record density and the data transmission speed can be expressed by the product of the line record density and the peripheral velocity of the magnetic disk.

For realizing a track density of 1500 tracks per inch or more utilizing a disk of a diameter 8~11 inches, it is preferable to select the pitch of the tracks at 12.7 μm or below. For avoiding the mutual interference between the tracks, it is preferable to provide a guard band of 3~5 μm. Therefore, it is preferable to set the track width at 9 μm or less.

The access time to the data (positioning time) should be reduced in accordance with the increase in the data transmission time. In the present invention, it is desirable to select an average access time of 10 msec or less. The disk rotation rate and the rotation wait time of a thin film magnetic head are preferably set at 3500 rpm or above and an average of 8.5 msec or below from the relation with the data transmission speed. Here, the rotation wait time means such a time in which a thin film magnetic head having transferred to a predetermined track position waits for writing information at a predetermined position in the track, or the head stands still and waits the magnetic disk to rotate for reading information from a predetermined position.

For realizing a large capacity magnetic disk device of this invention, the construction of the magnetic disk becomes extremely important.

A magnetic disk is constructed by applying a magnetic material layer or forming the layer by other means, on at least one surface of a non-magnetic substrate such as aluminum. Here, the thickness and the coercive force of the magnetic material layer become important.

More specifically, the line record density of 30 kilobits per inch corresponds to a record wavelength of about 2.5 μm. In this case, the spatial resolution cannot be assured unless the magnetization inversion width of the disk is 40% or less. The magnetization inversion width has an approximate relation of a $\propto \sqrt{\delta/Hc}$. Here, a denotes the magnetization inversion width, $\delta$ the thickness of the magnetic material layer, and Hc the coercive force of the magnetic material. The magnetization inversion width can be reduced small by reducing the thickness of the magnetic material layer and/or increasing the coercive force. As the magnetic disk, there can be listed the so-called coated medium which is formed by applying a mixture of magnetic powder such as $\gamma Fe_2O_3$ and binder on a non-magnetic disk, and the so-called continuous medium which is formed by depositing only a magnetic material on a non-magnetic disk by sputtering and does not contain any binder. In the case of coated-medium, the magnetization inversion width can be made to about 1.2~1.5 μm with a thickness of the magnetic material layer of 0.3 μm and a coercive force of 600 oersted. From this fact, it is preferable to select the thickness of the magnetic material layer to be 0.3 μm or less and the coercive force to be 600 oersted or less.

The situations are similar also for the continuous medium. The magnetization inversion width becomes small by reducing the layer thickness, enhancing the spatial resolution. By reducing the layer thickness at 0.1 μm or less, the magnetization inversion width can be reduced to about 1 μm.

It is preferable to provide a lubricate film made of a solid state or liquid state lubricant on the surface of the magnetic material layer of a magnetic disk, for avoiding wear and loss due to the contact by the magnetic head. The thickness of the lubricant film produces a substantial space and forms a factor for deteriorating the recording/reproducing characteristics when it is too thick. Thus, it is desirable to select a thickness at 0.05 μm or less.

In a magnetic disk device, the floating space of the thin film magnetic head also gives influence to the record density. For increasing the record density, it is preferable to decrease the floating space. In the present invention, it is preferable to set the space at 0.25 μm or less.

The magnetic disk device of this invention can perform writing and reading of information by using a general thin film magnetic head of inductance type. Here, however, it is more preferable to over-write information by using an over-writable head, particularly an over-writable head at 22 dB or more by the absolute value. When writing is done at the minimum frequency $f_1$ and over-writing is done at the maximum frequency $f_2$ thereover, the ratio $Ef_2/Ef_1$ of the output $Ef_2$ at the frequency $f_2$ to the residual output $Ef_1$ of the frequency $f_1$ is preferably 22 dB or more when the ratio is smaller than this, the influence of $Ef_1$ to the reproduced waveform appears strong and the error rapidly increases.

As the reproducing characteristics of the magnetic disk device, the resolution defined by the ratio of $Ef_1$ and $Ef_2$ is preferably 45% or more. For realizing this condition, it is preferable to provide a waveform improving circuit to shape the reproduced waveform and to sharpen the waveform, thereby to increase the resolution substantially. By so doing, the phase margin can be widened and the error can be reduced.

In the present invention, it is particularly desirable to use a thin film magnetic head of the below-described structure. Namely, it is particularly desirable to use a thin film magnetic head comprising a lower magnetic core, an upper magnetic core formed on the lower magnetic core, contacting at one end with one end of the lower magnetic core, and facing at the other end to the other end of the lower magnetic core through a magnetic gap, thereby forming with the lower magnetic core a magnetic circuit having a magnetic gap at one portion, and a conductor coil passing through the gap between the two magnetic cores and crossing the magnetic circuit, and having a gap depth which satisfies at a record wavelength of 1~2.5 μm the following formula $$G_d \leq 2.03 \times \frac{P_T \cdot \sqrt{\lambda} \cdot B_s}{(2 + \sqrt{\lambda})} - 2.1$$

where, $G_d$ is the gap depth (μm), $P_T$ the pole thickness (μm), $B_s$ is the saturation magnetic flux density of the upper magnetic core and the lower magnetic core (T), and $\lambda$ is the record wavelength.

Here, the above formula is applicable to a record wavelength range of 3.4 μm or less, and preferably to a record wavelength range of 1~2.5 μm.

The present inventors have clarified that the over-write characteristics are significantly influenced by the magnetic gap depth of the thin film magnetic head. The present inventors have also clarified that for improving the over-write characteristics, it is desirable that the pole thickness and the gap depth have a predetermined relation as shown by the above-mentioned formula. The above-mentioned formula is led out on the basis of the results of experiments in which several tens kinds of thin film magnetic heads having different gap depth and pole thickness are used and the over-write characteristics thereof are measured.

This formula can be approximated as $$G_d \leq 0.13\, P_T B_s (\lambda + 4.3) - 2.1.$$

More strictly, it is desirable to express in the formula $$G_d \leq 0.1326\, P_T B_s (\lambda + 4.34) - 2.1.$$

When the track width is reduced for increasing the track density, the output decreases in proportion thereto. For compensating this decrease, it is desirable to increase the output by increasing the turn number of the coil of the thin film magnetic head. Specifically, it is desirable to select 20 turns or more.

The thin film magnetic head is formed by forming a magnetic material layer on a non-magnetic substrate, and finally shaped in a slider shape, and then used. In this case, as the material of the substrate, it is preferable to ceramics of alumina, zirconia, silicon carbide, oxides of spinel structure such as $MgAl_2O_3$.

The weight for depressing the thin film magnetic head to a disk is lighter the better for enhancing slidability and is particularly preferably be set at 10 g or less.

It is desirable to put a crown at one end face of the slider of the thin film magnetic head, particularly at one of the faces facing to the magnetic disk. By so doing it becomes possible to utilize the whirl of air to the crown portion and to float the thin film magnetic head.

The slider shape of the thin film magnetic head can either be in a positive pressure slider shape in which the floating force on the side nearer to the tip of the head core is weakened or in a negative pressure type in which the opposite to the above is made.

As the magnetic material film of the thin film magnetic head, it is desirable to use a magnetic material of high saturation magnetic flux density for the upper magnetic core or both for the upper and the lower magnetic cores, particularly to use a material having a saturation magnetic flux density of 1 Tesla or above. As such magnetic materials, there are iron-nickel alloys typically exemplified by Permalloy, cobalt-iron-nickel alloys, etc. The upper magnetic core or the lower magnetic core may respectively formed in a laminar structure. In this case, the laminar film may be formed of lamination of magnetic films of different composition. It is preferable to form a laminate film by alternatively stacking magnetic films and non-magnetic films. In this case, an insulation film such as alumina or silicon oxide is preferable as the non-magnetic film. In case where non-magnetic films and magnetic films are alternately laminated, the composition of the magnetic films may be the same. Indeed, the composition may be varied. The total number of layers in the laminate film is two or more. Namely, at least two layers of one magnetic film and one non-magnetic film may be used. By alternately stacking magnetic films and non-magnetic films to form a laminate film, a form resembling to a single magnetic domain is made and the magnetic permeability at high frequencies can be increased by the reduction of the eddy current. Further, by using a magnetic material of high saturation magnetic flux density, a high magnetic flux density and an intense magnetic field may be generated to improve the over-write characteristics. As the method for forming the laminate, sputtering, plating, etc. may be employed.

In the magnetic disk device according to this invention, it is possible that two kinds of head, a read head and a write head, are used, writing is done with a thin film magnetic head of induction type having a large pole thickness, and reading is done with a head having a small pole thickness. By so doing, the over-write characteristics can be increased and the resolution in reading can be increased. By using a MR element for the read head, it is possible to increase the ratio S/N of the newly written signal S to the residual signal after the over-write N.

When a ferrite head is used, it is desirable to mount a thin film of high saturation magnetic flux density such as Permalloy at the tip of the head to improve the read/-write characteristics.

The thin film magnetic head may be contacted with the magnetic disk in the operation stop period of the magnetic disk device, and may be floated in accordance with the rotation of the magnetic disk. Alternatively, the thin film magnetic head may be floated prior to the commencement of operation, and the amount of floating may be controlled after the rotation reaches a predetermined rotation rate. Particularly, the latter method is appropriate and preferable for suppressing the wear of the magnetic disk surface or the wear of the head.

In case of reading information by using a thin film magnetic head, there is a unique problem of "wiggle". Wiggle is a phenomenon that the reproduced output varies irregularly, and forms a factor of read error. For suppressing this wiggle phenomenon, it is preferable to set the intensity of the external magnetic field to be 3 oersted or less.

Further, since the track width of the thin film magnetic head becomes narrower for increasing the record density, it is desirable not to make alignment at the servo plane but to employ an embedded servo system in which servo information is also written in the data plane.

This invention clarified the requirements to be satisfied by a magnetic disk device having a memory capacity of 30 giga bytes or more, and more particularly by a magnetic disk device having a memory capacity of 30~40 giga bytes.

Namely, it is clarified that the disk has a plane record density of 45~80 Mb/in$^2$ and the thin film magnetic head has almost null magnetic gap depth.

By decreasing the magnetic gap depth of the thin film magnetic head, leakage of the magnetic flux has decreased and the writing magnetic field can be raised. By this, writing into a disk of high coercive force is made possible.

The present inventors have clarified that the thin film magnetic head should have a magnetic gap depth derived by the following formula, $$G_d \leq 0.13 \, P_T B_s (\lambda + 4.3) - 2.1.$$

The present inventors have clarified that for realizing a magnetic disk device having a memory capacity of 30~40 giga bytes, it is desirable to do writing/reading to/from the disk by a thin film magnetic head satisfying the above formula and to set the data transmission speed at 4.5~6 mega bytes/sec.

These findings are derived by researching that the line record density and the track density of a disk, the magnetic gap depth of the thin film magnetic head, and the rotation rate of the disk become important for not enlarging the disk diameter upon increasing the memory capacity of the magnetic disk device, and clarifying the relation among these factors.

The present inventors do not know any prior art which studies and clarifies the requirements to be satisfied by a large capacity magnetic disk device having a memory capacity of 30~40 giga bytes.

In increasing the record density of the disk, the thickness of the pole of a thin film magnetic head for writing or reading information in or from a disk becomes important. Specifically, it is desirable to decrease the thickness of the pole of the thin film magnetic head, to enable writing at a smaller wavelength. When the pole thickness is large, the line record density in the track cannot be increased. It is also desirable to decrease the track width of the magnetic head.

A magnetic disk device of such an extremely large capacity that the memory capacity is 30~40 giga bytes could be realized according to this invention.

Further, the thin film magnetic head and the magnetic disk to be used in such a large capacity magnetic disk device are clarified.

DESCRIPTION OF THE PREFERRED EMBODIMENTS

Figure 1:
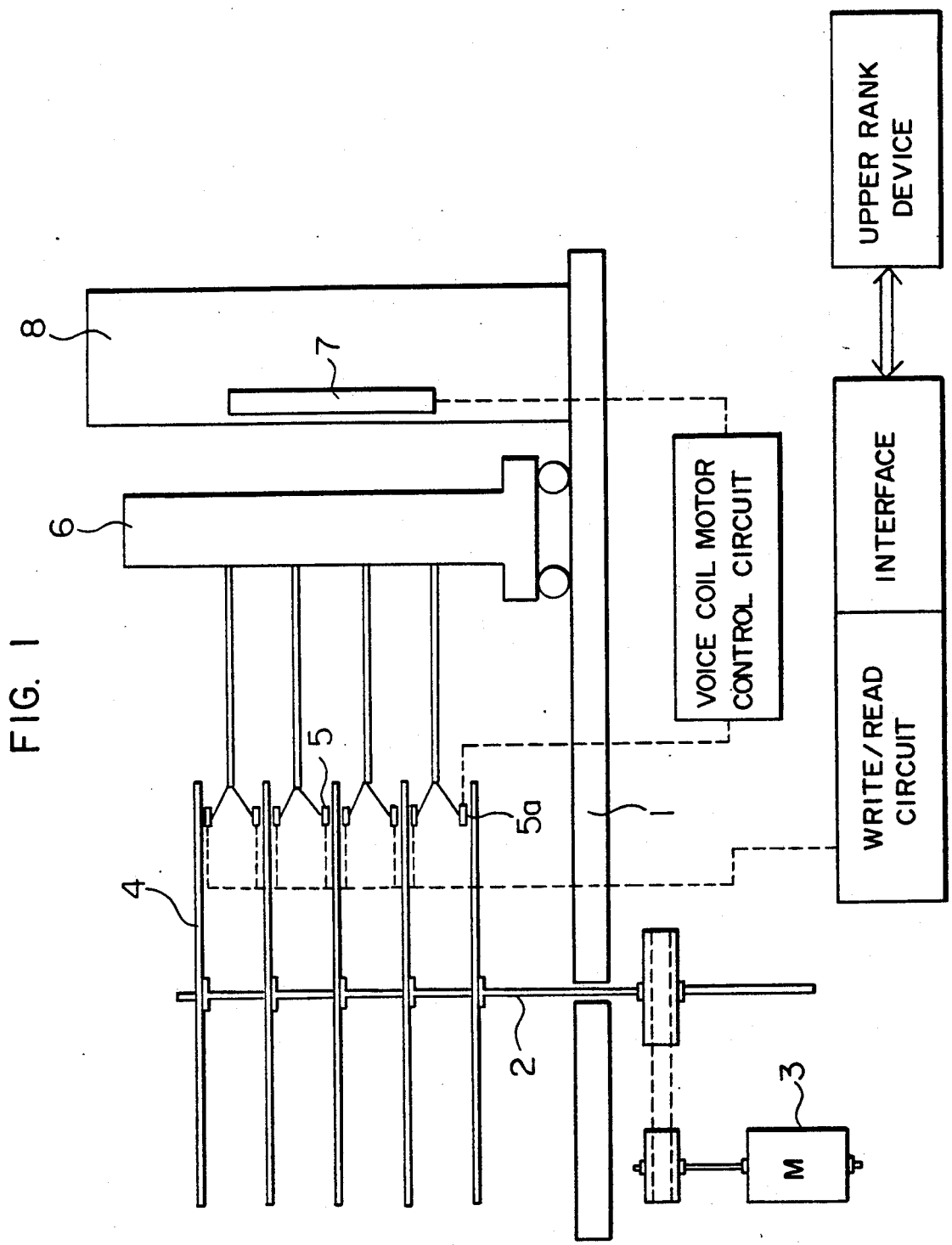
FIG. 1 is a schematic structural view showing a magnetic disk device according to an embodiment of this invention.

FIG. 1 schematically shows a magnetic disk device according to an embodiment of this invention.

Figure 2:
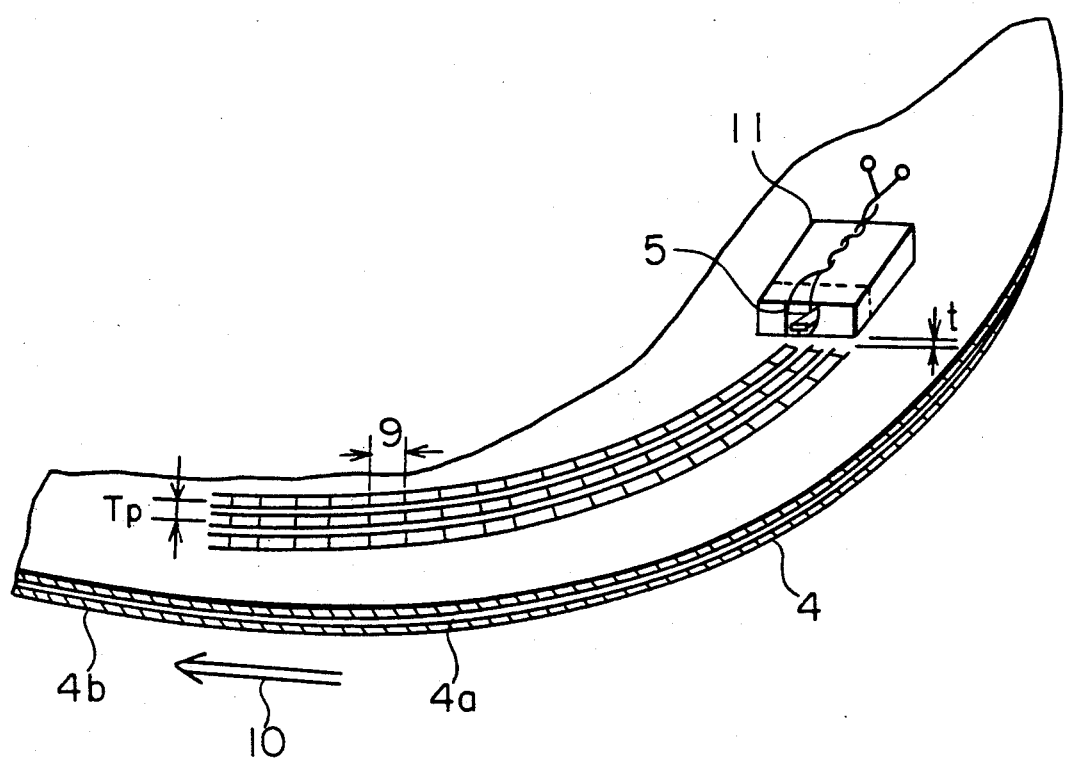
FIG. 2 is an enlarged perspective view of the neighborhood of the magnetic head of FIG. 1.

FIG. 2 is an enlarged perspective view of the neighborhood of the thin film magnetic head 5 shown in FIG. 1.

The magnetic disk device has constituent elements denoted by reference numerals 1~8 and shown in FIG. 1 and a voice coil motor control circuit. Numeral 1 denotes a base, and numeral 2 denotes a spindle. A plurality of circular-plate-shaped magnetic disks 4 are mounted on one spindle as shown in FIG. 1. The magnetic disk 4 is formed of a non-magnetic disk 4a of alumina, etc. having one or both surfaces provided with a magnetic material layer or layers 4b shown in FIG. 2. A multiplicity of track grooves are provided in the magnetic material layer 4b. The plane record density of the magnetic disk 4 is 45~80 mega bits per square inch. The track density is preferably selected to be 1500 tracks per inch or more. The line record density is preferably set to be 30 kilo bits per inch or more. Further within the ranges of these line record density and the track density, the plane record density which is the product of these two is preferably set to be 45~80 mega bits per square inch as described above.

By so doing, the record density can be increased without significantly increasing the disk diameter.

Even when the record density is increased and the memory capacity of information is made large, there would be little practical value if the data transmission velocity is delayed by the corresponding amount. When the data transmission speed is set at 4.5~6 mega bytes/sec, the loading and retrieval of data can be done swiftly. This data transmission speed is determined by the product of the peripheral velocity of the disk and the line record density. Since the line record density is 30 kilo bits per inch, the data transmission speed of 4.5~6 mega bytes/sec can be realized by selecting the disk rotation rate at 3500 rpm or above in the case of disks of a diameter of 8~11 inches. The rotation rate of 3500 rpm is an ordinary rotation rate employed in a general magnetic disk device, and hence is easily attainable.

Although FIG. 1 shows a case where fine magnetic disks are mounted on one spindle, the number of disks is not limited to five. In the magnetic disk device according to the present invention, a plurality of units each contain a plurality of disks mounted on one spindle are equipped.

Reference numeral 3 denotes a motor for driving the spindle 2 and hence rotating the disks. Reference numeral 5 denotes a magnetic head for data, and the reference symbol 5a denotes a positioning magnetic head. Reference numeral 6 denotes a carriage, 7 a voice coil, and 8 a magnet. A voice coil motor is constructed with the voice coil 7 and the magnet 8. The positioning of the head is achieved by the elements denoted by 6, 7 and 8. The voice coil 7 and the magnetic heads 5 and 5a are connected through a voice coil motor control circuit. In FIG. 1, the upper rank device denotes for example a computer system.

FIG. 2 is an enlarged view of the magnetic head and the magnetic disk. Reference numeral 11 denotes a slider, 9 the record wavelength, and 10 the sense of disk rotation. Reference symbol t denotes the amount of floating of the magnetic head, and Tp the track pitch.

Figure 3:
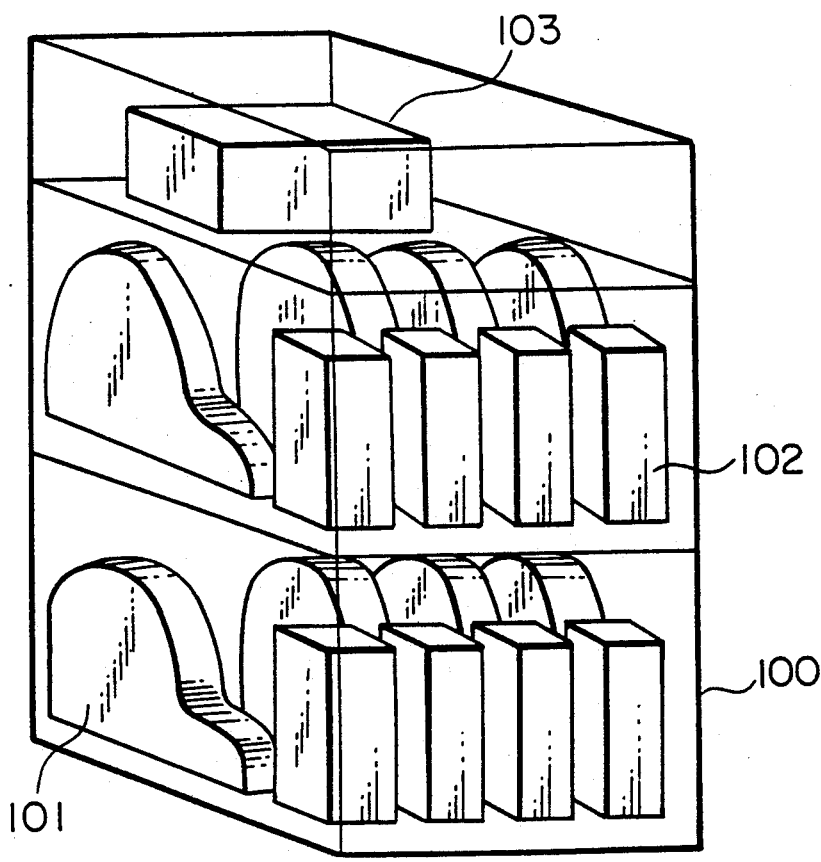
FIG. 3 is a perspective view of the magnetic disk device accommodated in a predetermined space.

FIG. 3 shows the magnetic disk devices according to this invention in the state of being accommodated in a predetermined space, in a perspective view.

Inside a container 100, head disk assemblies (HDA) 101, casings 102 each containing a drive circuit and a power source, and an interface 103 to a computer are contained. There are eight HDAs 101, which are contained in two stages, each including four. The container 100 has a bottom plane having a side of 0.5~1.5 m and a height of about 2 m.

The magnetic disk device is used in such a manner that new information is written in a record medium which has already been written information. This type of operation is called "over-write". The information previously written is detected as noises with respect to the newly written information. Therefore, for writing new information into the medium, it is required to produce a magnetic field necessary for magnetizing the medium from the top end of the magnetic head. Particularly in the large capacity magnetic disk, this over-write characteristics is of importance.

The intensity of the magnetic field emanating from the top end of the thin film magnetic head becomes larger as the magnetic gap depth is smaller. Thus, the relation between the noise characteristics in the over-written state required as the magnetic disk device and the magnetic gap depth was examined and the relation with the magnetic gap depth for avoiding erroneous operation as the disk device was researched.

Figure 12:
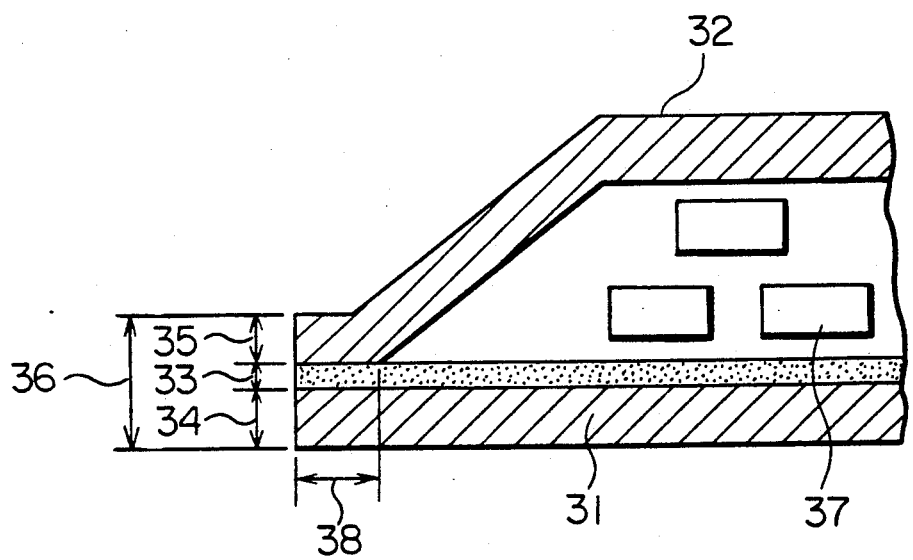
FIG. 12 is a cross-section of a tip portion of a thin film magnetic head.

FIG. 12 shows a schematic structure of the top end portion of the magnetic core of the thin film magnetic head used in the magnetic disk device according to this invention. The length in which a lower magnetic core 31 and an upper magnetic core 32 are in parallel is the magnetic gap depth 38. Numeral 34 denotes the thickness of the lower magnetic core at the disk opposing surface, 35 the thickness of the upper magnetic core at the similar disk opposing surface, and 33 the magnetic gap length. Reference numeral 36 denotes the thickness of the pole, and 37 conductor coilings. In the large capacity magnetic disk device, the over-write system becomes important in which new information is directly written over the already-written information. As the over-write characteristics, it is required to provide an absolute value of 22 dB or more.

Figure 4:
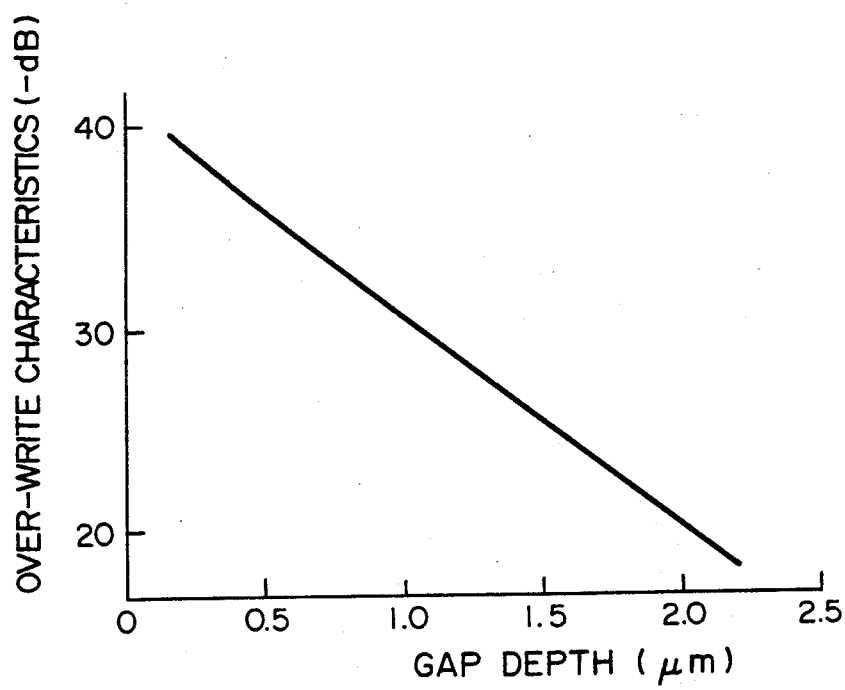
FIG. 4 is a characteristic graph showing the dependency of the over-write characteristics on the gap depth.

Then, the relation between the magnetic gap depth and the over-write characteristics was studied on the case of the record wavelength 3.4 $\mu$m, the amount of floating 0.27 $\mu$m, a coated medium having a medium thickness of 0.5 $\mu$m (content of magnetic material 65% or more), and the coercive force of the medium 430 oersted. The obtained results are shown in FIG. 4. From the results, it was found that the over-write characteristics takes a high value as the gap depth is made small. It was found that for using a thin film magnetic head, it is important to control the magnetic gap depth to a high precision.

Figure 5A:
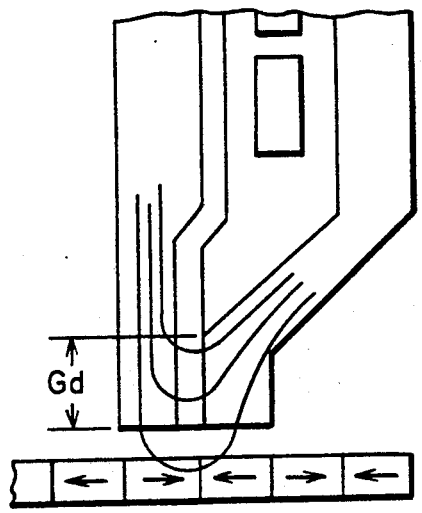
FIGS. 5A and 5B are illustrations showing the flow of the magnetic flux at the tip portion of the head.
Figure 5B:
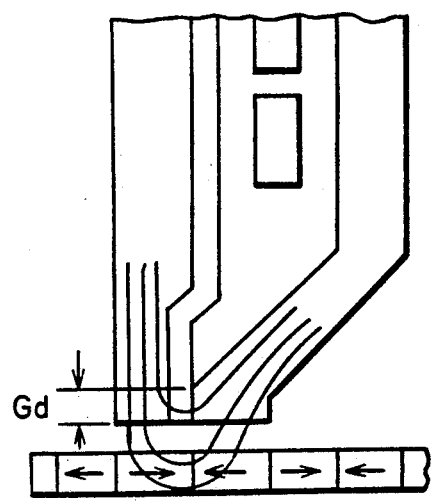

This is due to the fact that the magnetic flux emanating from the magnetic core tip portion to ward the recording medium becomes stronger as the magnetic gap depth is shorter as shown in FIGS. 5A and 5B.

The memory capacity of a magnetic disk device is increasing along with the progress in the performances of the electronic computers. One expedient for attaining progress in the performances of the magnetic disk device is shortening the record wavelength.

Figure 6:
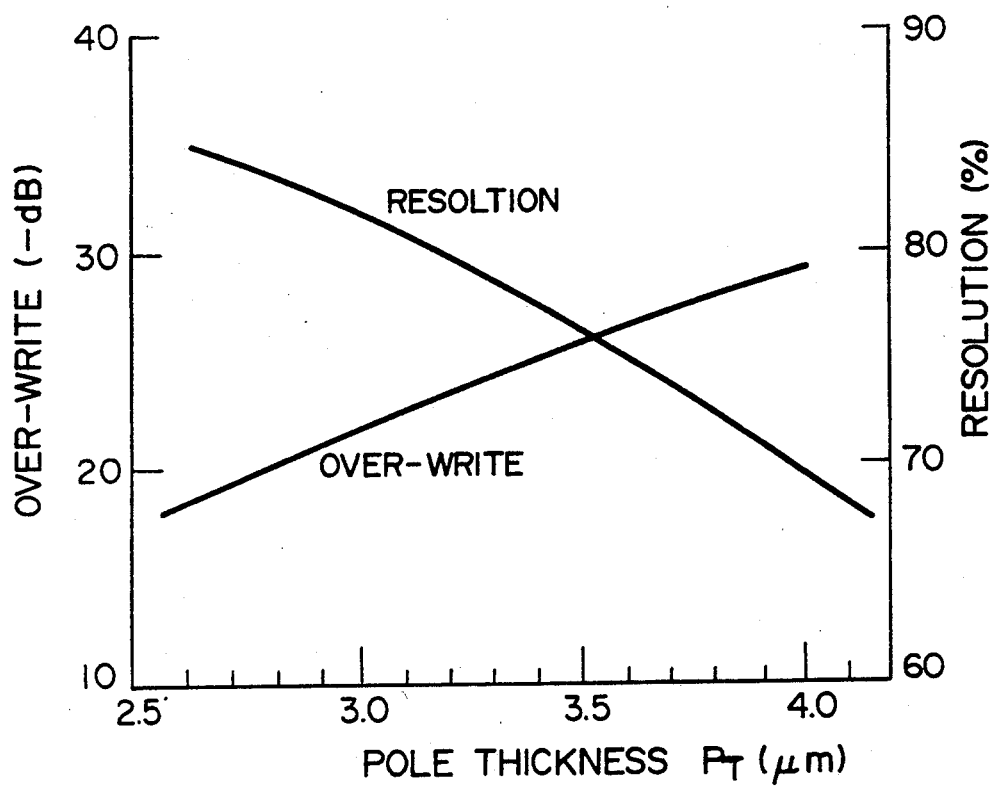
FIG. 6 is a characteristics graph showing the pole thickness dependency of the over-write characteristic and the resolution characteristic.

Thus, firstly, for the case of a record wavelength 3.4 $\mu$m, research was made on the total sum of the upper and the lower magnetic cores and the magnetic gap length (referred to as pole thickness hereinbelow), the over-write characteristics, and the resolution which is the ratio of signal intensities ($f_2/f_1$) at the two frequencies $f_1$ and $f_2$ used by the magnetic disk device, using permalloy having a saturation flux density of 1 tesla as the magnetic cores. The obtained results are shown in FIG. 6. It was found from FIG. 6 that the over-write characteristics takes a higher value as the pole thickness increases. In contrast to this, the resolution was found to decrease as the pole thickness becomes thicker. As described above, the over-write characteristics is required to have an absolute value of 22 dB or more. Thus, it was found that the pole thickness should be 3.1 $\mu$m or more. Based on these results, the optimization of the resolution was discussed. A pole length of 3.7 $\mu$m was employed for the magnetic head in the magnetic disk device which satisfies the write and read characteristics and has a record wavelength of 3.4 μm.

Next, examination was made to further shorten the record wavelength and to improve the record density.

Figure 7A:
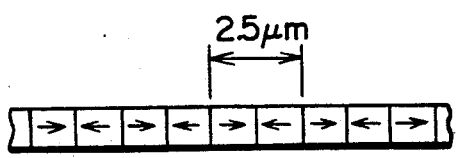
FIGS. 7A and 7B are illustrations showing the dependency of the tip shape of the head on the record wavelength.
Figure 7A:
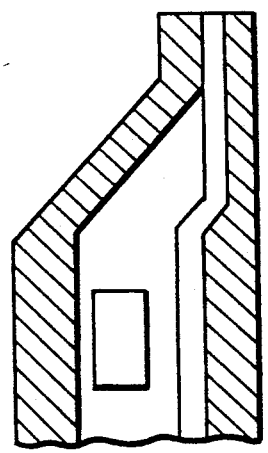
Figure 7B:
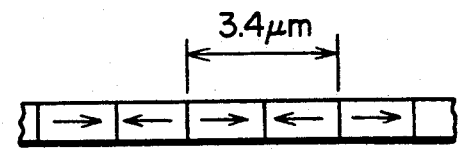
Figure 7B:
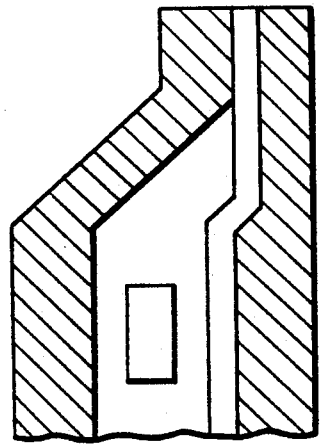

As the results, as shown in FIGS. 7A and 7B, it was found that the pole thickness should be reduced and the magnetic gap depth should be made small. As the result of proceeding the examination along this approach, it was found that since the pole thickness becomes small, as is apparent from FIG. 6, the over-write characteristics becomes deteriorated, and that when the deterioration is to be recovered by varying the magnetic gap depth, the magnetic gap depth should be reduced to the order of 0.1 μm in case of a record wavelength of 2.5 μm. it is difficult to control the magnetic gap depth to the order of 0.1 μm. Then, further examination was made. As the result, the pole thickness is made as thick as possible for assuring the over-write characteristics and to afford tolerance to the dimension accuracy of the magnetic gap depth. When the pole thickness is made large, as is seen from FIG. 6, the resolution lowers. It, however, can be treated by the signal processings such as waveform processings. The results on the case of a record wavelength 3.4 μm were assembled. It was found that the gap depth can be made large by selecting the pole thickness at the conventionally employed value of 3.7 μm.

The situation of magnetic recording is determined by the total of the head and the medium. Thus, a thin film magnetic head having a pole thickness of 3.7 μm was used, and the relation among the record wavelength, the coercive force of the medium, the thickness of the medium, the gap (amount of floating) between the medium and the head was researched, looking about the future improvement in the record density.

Figure 8:
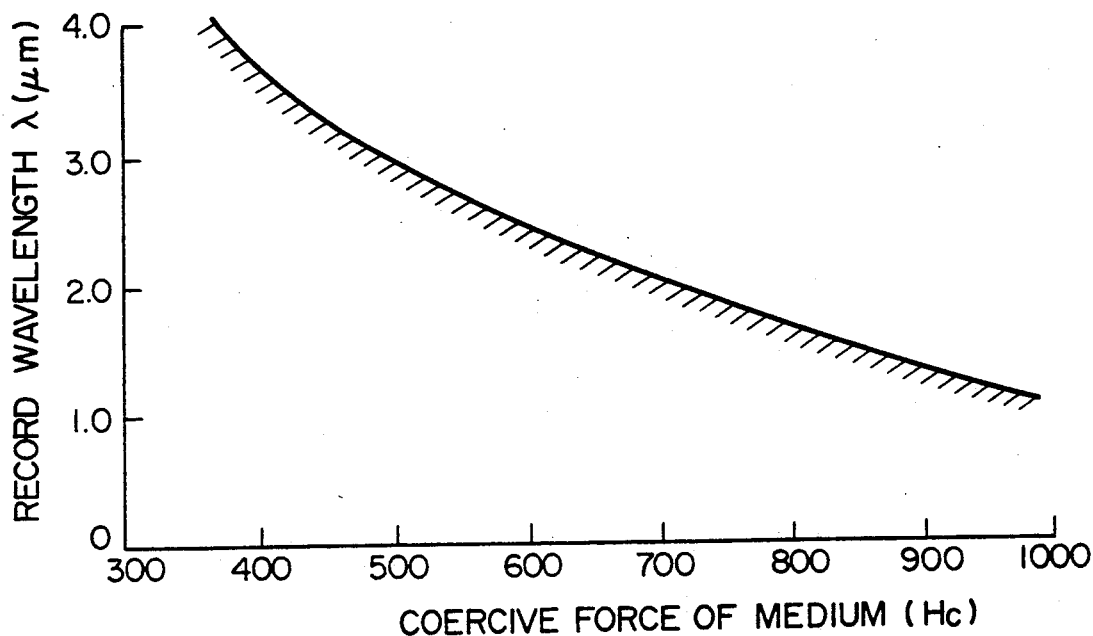
FIG. 8 is a characteristics graph showing the relation of the coercive force of the medium and the record wavelength.
Figure 9:
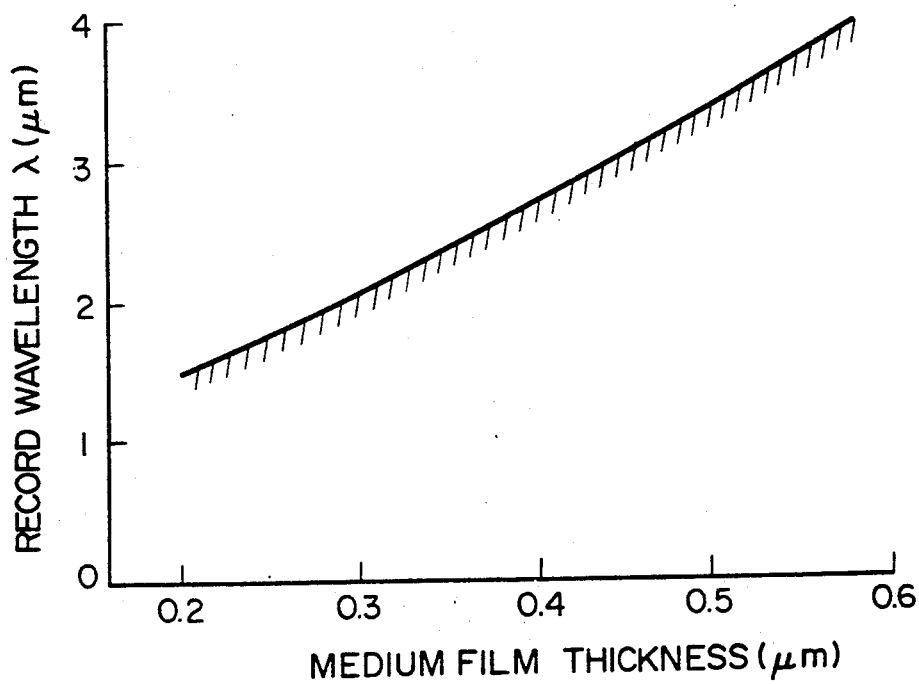
FIG. 9 is a characteristics graph showing the relation between the thickness of the medium film and the record wavelength.
Figure 10:
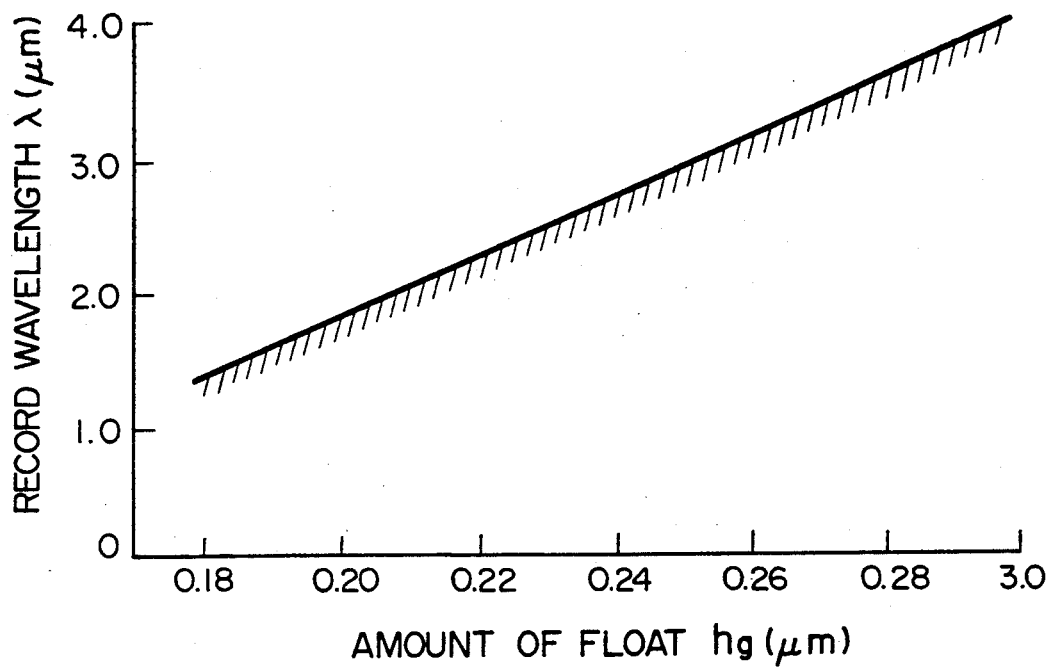
FIG. 10 is a characteristics graph showing the relation between the amount of floating and the record wavelength.

The obtained results are shown in FIGS. 8 to 10. FIG. 8 shows the relation between the record wavelength λ and the coercive force of the medium Hc. FIG. 9 shows the relation between the record wavelength and the medium thickness, and FIG. 10 shows the relation between the record wavelength and the distance between the head and the medium (the amount of float of the head). From these figures, it can be seen that for coping with the increase in the density, the thickness of the medium should be made small as well as the coercive force of the medium should be improved.

Here, the dependencies of the amount of float $h_g$, the film thickness of the medium $t_{mag}$ and the coercive force of the medium $H_c$ on the record wavelength are obtained, setting references for the record wavelength of 3.4 μm, the amount of float of 0.27 μm, the film thickness of the medium of 0.5 μm and the coercive force of 430 oersted, which have been practically used.

Letting the reference float amount be $h_{go}$, it is known that the float amount $h_g$ can be expressed by $$h_g = h_{go} \sqrt{\frac{\lambda}{\lambda_o}}, \quad (1)$$

the film thickness of the medium $t_{mag}$ can be expressed by $$t_{mag} = t_{mag} \frac{\lambda}{\lambda_o}, \quad (2)$$

and the coercive force of the medium $H_c$ can be expressed by $$H_c = H_{co} \frac{\lambda_o}{\lambda}. \quad (3)$$

Here, λ represents the record wavelength, and $\lambda_o$ above-mentioned reference record wavelength. Also, the gap depth $G_d$ for generating a magnetic field intensity required for realizing a over-write characteristics of 22 dB (absolute value) by the thin film magnetic head is found to be expressed by $$G_d \propto \frac{P_T \cdot B_s}{\left(h_g + \frac{1}{2} t_{mag}\right) H_c}. \quad (4)$$

Actually, equation (4) is substituted into equations (1), (2) and (3). Then, calculation is made using the fact that the gap depth $G_d$ at the reference values of the above-mentioned $h_{go}$, $t_{mag}$, $H_{co}$ and $\lambda_o$ is 1.5 μm, to provide $$G_d \leq 2.03 \times \frac{P_T \cdot B_s \cdot \sqrt{\lambda}}{(2 + \sqrt{\lambda})} - 2.1. \quad (5)$$

Figure 11:
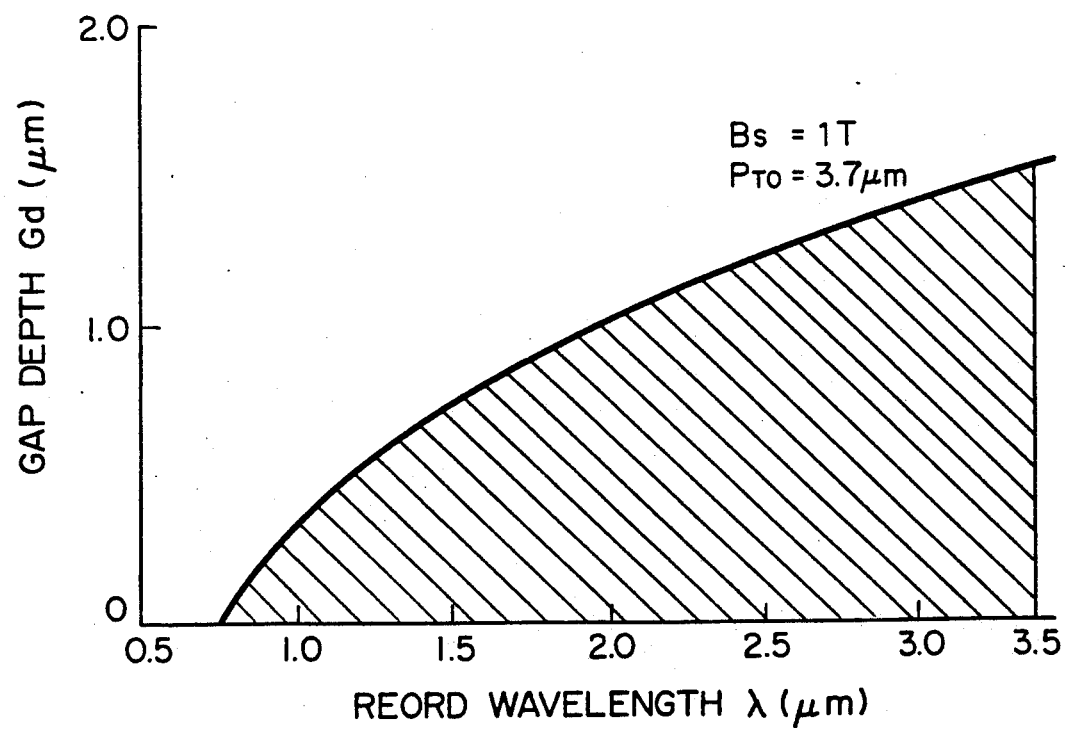
FIG. 11 is a characteristics graph showing the dependency of the gap depth on the record wavelength.

Based on this result, the relation between the record wavelength at which the over-write of 22 dB in the absolute value can be obtained, and the gap depth was obtained. The obtained result is shown in FIG. 11. It was found that below the line, high performance recording having an over-write characteristics of 22 dB or more in absolute value can be made.

Next, for improving the recording and reproducing characteristics with the magnetic head, examination was made on the applicability of magnetic materials of high saturation flux density which are being researched and developed.

As the result, it was found that the use of a magnetic material of high saturation flux density effectively increases $P_T$ in the above-mentioned formula (1), and thereby the saturation flux density compared to a permalloy having a saturation flux density of 1 Tesla takes a value $$P_T = \frac{\text{high saturation flux density}}{\text{saturation flux density of permalloy (1 Tesla)}}.$$

In this case, as is apparent from formula (5), the gap depth $G_d$ can be widened.

Figure 13:
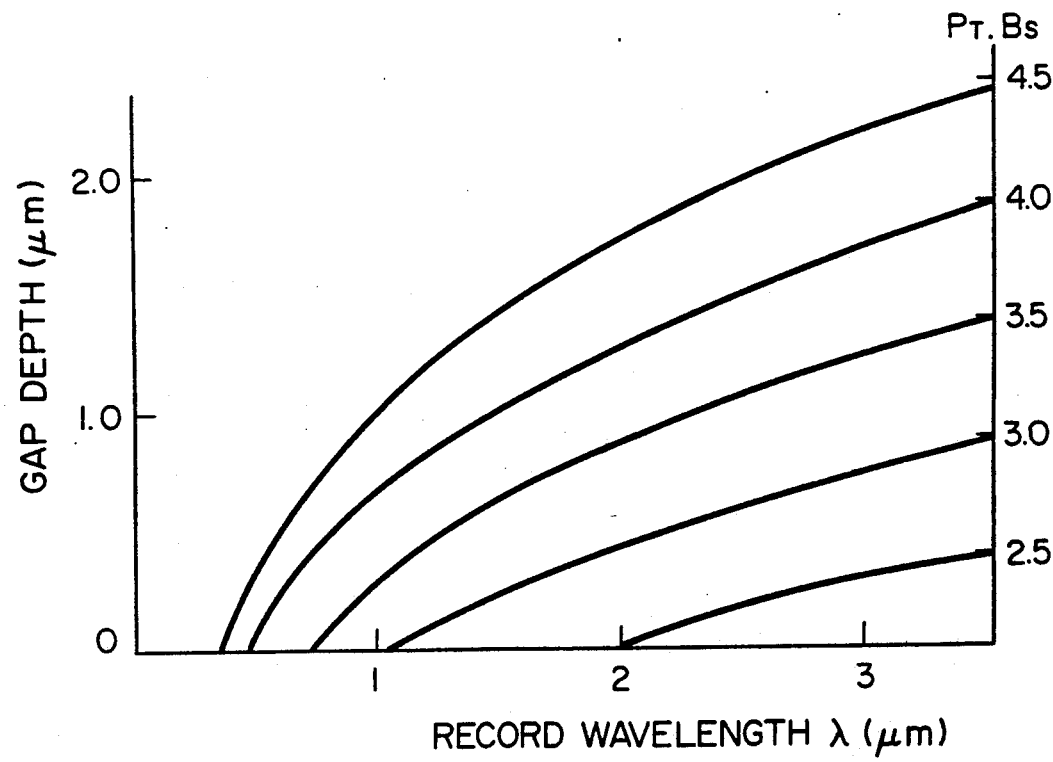
FIG. 13 is a characteristics graph showing the relation among the gap depth of the thin film magnetic head, the product of the saturation magnetic flux density of the core and the pole length, and the record wavelength.

FIG. 13 shows the result of more detailed analysis of the characteristics of FIG. 11, from the points of the magnetic gap depth, the product of the pole length ($P_T$) and the saturation flux density ($B_s$) of the head core, and the record wavelength.

As the result, it was found that the above-mentioned formula (5) can also be expressed approximately as $$G_d \leq 0.13 \, P_T B_s (\lambda + 4.3) - 2.1 \quad (6),$$

use is possible below the respective lines.

Next, $P_T$ was fixed at 3.7 μm in the above-mentioned formula (1), and examination was made to further reduce the magnetic gap length which is considered to be necessary for the improvement of the record density.

As the result, it was found that when the magnetic gap length is reduced, the distribution of the magnetic field becomes abrupt and the resolution is improve, but the magnetic gap depth of interest becomes narrower than that shown in FIG. 11, and that for keeping the overwrite characteristics not below 22 dB in the absolute value and keeping the gap length large, it is effective to keep the gap length at substantially 0.4 μm which has been examined heretobefore.

As described in the above, formulas (5) and (6) stand for a condition that the gap is substantially 0.4 μm. However, the coefficient 0.13 in formula (6) will vary substantially in proportion to the gap length. Thus, the formula is expressed approximately as:

$$G_d \leq Q\, P_T B_s (\lambda + 4.3) - 2.1 \qquad (7),$$

where Q is a coefficient having a value according to gap length and in formula (6) has the value of 0.13 for the gap length of substantially 0.4 μm. For example, the value of Q is determined in that the value 0.13 is proportionally increased to be a ratio of a given gap length defined by the cores at the pole tip to the gap length of 0.4 μm.

We claim:

1. In a magnetic disk device comprising a magnetic disk for recording information, and a thin film magnetic head for carrying out writing and reading information with respect to said magnetic disk, the magnetic disk device characterized by comprising a plurality of head disk assemblies, each having a plurality of said magnetic disks, each having a plane record density more than 45 mega bits per square inch mounted on one rotation axis, comprising said thin film magnetic head in which a pole thickness ($P_T$), a saturation magnetic flux density ($B_s$) of a head core, the magnetic gap depth ($G_d$) (μm) and a record wavelength ($\lambda$) (μm) satisfy, at a record wavelength less than 2.5 μm, the formula $$G_d \leq 0.13\, P_T B_s (\lambda + 4.3) - 2.1,$$

and comprising magnetic disk rotation means for rotating said magnetic disk.

2. A magnetic disk device according to claim 1, characterized in that said thin film magnetic head is provided with a coil turn number of not less than 20.

3. A magnetic disk device according to claim 1, characterized by comprising a write-only head an a read-only head.

4. A magnetic disk device according to claim 3, characterized in that a MR head is provided as said read-only head.

5. A magnetic disk device according to claim 3, characterized in that an induction type head is provided as said write-only head.

6. A magnetic disk device according to claim 1, wherein said thin film magnetic head has substantially no magnetic gap depth between an upper and a lower magnetic core, and has a gap which immediately expands in a direction of departing from a face opposing to said magnetic disk.

7. A magnetic disk device according to claim 1, wherein said magnetic disk has a magnetic material layer which has a coercive force of not less than 600 oersteds.

8. A magnetic disk device according to claim 1, wherein each of said magnetic disks has a diameter of 8~11 inches, said thin film magnetic head having substantially no magnetic gap depth between an upper and a lower magnetic core, and having a gap which immediately expands in a direction of departing from a face opposing to said magnetic disk.

9. A magnetic disk device according to claim 1, wherein said plurality of head disk assemblies are provided in a number sufficient to establish a total memory capacity of not less than 30 giga bytes.

10. A magnetic disk device according to claim 1, wherein each magnetic disk has a track density of 1500~3000 tracks per inch and a line record density of 30~50 kilobytes per inch, and said thin film magnetic head has a saturation magnetic flux density of the head core of 1.2T or less, a pole thickness of 3.7 μm or less and a magnetic gap depth of 2.4 μm or less, and wherein the overwrite characteristics is 22 dB or less.

11. A magnetic device according to claim 1, wherein the plane record density is 45~80 mega bits per square inch.

12. In a magnetic disk device comprising a magnetic disk for recording information, and a thin film magnetic head for performing writing and reading information with respect to said magnetic disk, a magnetic dick device characterized by comprising a plurality of head disk assemblies, each having a plurality of magnetic disks, each having a plane record density of 45~80 mega bits/square inch and a track density of 1500~3000 tracks inch, mounted on one rotation axis, comprising said thin film magnetic head in which a pole thickness ($P_T$), a saturation magnetic flux density ($B_s$) of a head core, a magnetic gap depth ($G_d$) and a record wavelength ($\lambda$) satisfy, in a range of a record wavelength of 1~2.5 μm, the formula $$G_d \leq 0.13\, P_T B_s (\lambda + 4.3) - 2.1,$$

and comprising magnetic disk rotation means for rotating said magnetic disks at a speed of not less than 24 m per second.

13. In a magnetic disk device comprising a magnetic disk for recording information, and a thin film magnetic head for performing writing and reading information with respect to said magnetic disk, a magnetic disk device characterized by comprising a plurality of head disk assemblies, each having a plurality of magnetic disks, each having a plane record density of 45~80 mega bits/square inch and a line record density of 30~50 kilo bits/inch, mounted on one rotation axis, comprising said thin film magnetic head in which a pole thickness ($P_T$), a saturation magnetic flux density ($B_s$) of a head core, a magnetic gap depth ($G_d$) and a record wavelength ($\lambda$) satisfy, in a range of a record wavelength of 1~2.5 μm, a formula $$G_d \leq 0.13\, P_T B_s (\lambda + 4.3) - 2.1,$$

and comprising magnetic disk rotation means for rotating said magnetic disks at a speed of not less than 24 m per second.

14. In a magnetic disk device comprising a magnetic disk for recording information, and a thin film magnetic head for performing writing and reading information with respect to said magnetic disk, a magnetic disk device characterized by comprising a plurality of head disk assemblies, each having a plurality of magnetic disks, each having a diameter of 8~11 inches and a plane record density of 45~80 mega bits/square inch, mounted on one rotation axis, comprising said thin film magnetic head in which the pole thickness ($P_T$), a saturation magnetic flux density ($B_s$) of a head core, a magnetic gap depth ($G_d$) and a record wavelength ($\lambda$) satisfy, in a range of a record wavelength of $1 \sim 2.5$ $\mu$m, a formula $$G_d \leq 0.13 \, P_T B_s (\lambda + 4.3) - 2.1,$$

and comprising magnetic disk rotation means capable of rotating said magnetic disks at a rate not less than 3500 rpm.

15. In a magnetic disk device comprising a plurality of head disk assemblies, each comprising a plurality of magnetic disks supported by one rotation axis, and a plurality of thin film magnetic heads for performing writing and reading information with respect to said magnetic disks, and means for rotating said magnetic disks, said magnetic disk device characterized by comprising said plurality of magnetic disks, each having a diameter of $8 \sim 11$ inches, a track density of $1500 \sim 3000$ TPI, a line record density, realized at a record wavelength of $1 \sim 2.5$ $\mu$m, of $30 \sim 50$ KbPI, and a plane record density of $45 \sim 80$ Mb/in$^2$, so that a total memory capacity becomes at least 30 giga bytes, comprising said thin film magnetic heads, each thin film magnetic head having a magnetic gap depth between an upper and a lower magnetic core smaller than a magnitude obtained by a below-mentioned formula, and having substantially no magnetic gap depth, said rotating means having a peripheral velocity capable of making a data transmission speed of at least 4.5 mega bytes/sec, said plurality of head disk assemblies and said disk rotating means are installed in a container which has a space where one side of a floor thereof is $0.5 \sim 1.5$ m and a height not said magnetic gap depth satisfy, the formula, higher than 2 m, $$G_d \leq 0.13 \, P_T B_s (\lambda + 4.3) - 2.1$$

Here, $G_d$: magnetic gap depth ($\mu$m),
$P_T$: pole thickness ($\mu$m),
$B_s$: saturation magnetic flux density (T), and
$\lambda$: record wavelength ($\mu$m).

16. A magnetic disk device according to claim 15, characterized in that nine magnetic disks are provided on one rotation axis, both surfaces of each magnetic disk are constructed to be record planes, and the total memory capacity per disk assembly is at least 3.8 giga bytes.

17. A magnetic disk device according to claim 15, characterized in that nine stacked magnetic disks are provided in one head disk assemblies, and among sixteen surfaces of said nine magnetic disks except the uppermost and the lowermost surfaces, at least fifteen surfaces are made to be record surfaces.

18. A magnetic disk device according to claim 15, characterized by comprising said head disk assemblies in a total sum of eight.

19. A magnetic disk device according to claim 15 characterized by comprising a positioning unit for said thin film magnetic heads, and an interface to an upper rank device, and by these installed in said space.

20. In a thin film magnetic head comprising a lower magnetic core, an upper magnetic core formed on the lower magnetic core, having one end contacting one end of the lower magnetic core and the other end opposing to the other end of the lower magnetic core through a magnetic gap, thereby forming with the lower magnetic core, a magnetic circuit having a magnetic gap at a portion, and a conductor coil passing through the region between the two magnetic cores and crossing the magnetic circuit, a thin film magnetic head characterized by having a gap depth which satisfies the following formula, $$G_d \leq 2.03 \times \frac{P_T \cdot \sqrt{\lambda} \cdot B_s}{(2 + \sqrt{\lambda})} - 2.1$$

where, $G_d$ denotes a gap depth ($\mu$m), $P_T$ a pole thickness ($\mu$m), $B_s$ a saturation magnetic flux density (T) of the upper and the lower magnetic cores, and $\lambda$ a record wavelength ($\mu$m).

21. In a thin film magnetic head comprising a lower magnetic core, an upper magnetic core formed on the lower magnetic core, having one end contacting one end of the lower magnetic core and the other end opposing the other end of the lower magnetic core through a magnetic gap, thereby forming with the lower magnetic core, a magnetic circuit having a magnetic gap at a portion, and a conductor coil passing through the region between the two magnetic cores and crossing the magnetic circuit, a thin film magnetic head characterized by having a gap depth which satisfies the following formula, $$G_d \leq 0.13 \, P_T B_s (\lambda + 4.3) - 2.1,$$

where, $G_d$ denotes a gap depth ($\mu$m), $P_T$ a pole thickness ($\mu$m), $B_s$ a saturation magnetic flux density (T) of the upper and the lower magnetic cores, and $\lambda$ a record wavelength ($\mu$m).

22. A thin film magnetic head according to claim 20 or 21, characterized in that said upper magnetic core and said lower magnetic core have a saturation magnetic flux density of not less than 1 tesla.

23. A method of recording/reproducing information in a magnetic disk device characterized by comprising a plurality of head disk assemblies, each having a plurality of magnetic disks, each having a disk shape of a diameter of $8 \sim 11$ inches and a plane record density of $45 \sim 80$ mega bits/square inch, mounted on one rotation axis, comprising a thin film magnetic head for performing writing and reading of information with respect to said magnetic disk, where said thin film magnetic head has substantially no magnetic gap depth between upper and lower magnetic cores and the gap immediately expands in the direction departing from a face opposing to the magnetic disk, comprising magnetic disk rotation means capable of rotating the magnetic disk at 3500 rpm or above, comprising positioning means for positioning said thin film magnetic head and interface to an upper rank device, comprising said thin film magnetic head in which the magnetic gap depth between upper and lower magnetic cores satisfies the following formula, $$Gd \leq 0.13 \, P_T B_s (\lambda + 4.3) - 2.1,$$

where, $G_d$ denotes a gap depth (μm),
$P_T$ the pole thickness,
$B_s$ a saturation magnetic flux density of the upper and the lower magnetic cores, and
λ a record wavelength (μm), and
positioning said thin film magnetic head on the basis of the command from said upper rank device and performing writing and reading information in and from said magnetic disk at a record wavelength of 1~2.5 μm.

24. A method of recording/reproducing information in a magnetic disk device according to claim 23, characterized in that the average positioning time for transferring said thin film magnetic head from a predetermined position on said magnetic disk to another predetermined position and positioning the head so as to performed writing/reading of information, is set not higher than 10 msec.

25. A method of recording/reproducing information in a magnetic disk device according to claim 23, the saturation magnetic flux density of the upper and the lower magnetic cores is not less than 1 T.

26. A method of recording/reproducing information in a magnetic disk device according to claim 23, characterized in that said thin film magnetic head is provided with a magnetic gap depth between the upper and the lower magnetic cores satisfies the following formula, and the saturation magnetic flux density of the upper and the lower magnetic cores is not less than 1 T, $$G_d \leq 2.03 \times \frac{P_T \cdot \sqrt{\lambda} \cdot B_s}{(2 + \sqrt{\lambda})} - 2.1,$$

where, $G_d$ denotes the gap depth (μm), $P_T$ the pole thickness (μm), $B_s$ the saturation magnetic flux density of the upper and the lower magnetic cores, and λ the record wavelength (μm).

27. In a magnetic disk device comprising a magnetic disk for recording information, and a thin film magnetic head for performing writing and reading information with respect to said magnetic disk, said magnetic disk device characterized by comprising a plurality of head disk assemblies, each having a plurality of magnetic disks, each having a plane record density of 45~80 mega bits per square inch, mounted on one rotation axis, said thin film magnetic head comprising a lower magnetic core, an upper magnetic core formed on the lower magnetic core and having one end contacting one end of the lower magnetic core and the other end opposing the other end of the lower magnetic core through a magnetic gap, thereby forming with the lower magnetic core a magnetic circuit having a magnetic gap at a portion thereof, and a conductor coil passing between the two magnetic cores and crossing the magnetic circuit, and having a gap depth, at a record wavelength of 1~2.5 μm, which satisfies the following formula, $$G_d \leq 2.03 \times \frac{P_T \cdot \sqrt{\lambda} \cdot B_s}{(2 + \sqrt{\lambda})} - 2.1$$

where, $G_d$ denotes a gap depth (μm), $P_T$ a pole thickness (μm), $B_s$ a saturation magnetic flux density (T) of the upper and the lower magnetic cores, and λ a record wavelength (μm).

28. A magnetic disk device according to claim 27, characterized in that at least one of said lower magnetic core and said upper magnetic core is formed of a laminate in which a magnetic film material and a non-magnetic film are alternately stacked to the total layer number of two or more.

29. A magnetic disk device according to claim 27, characterized in that the magnetic material of at least one of said lower magnetic core and said upper magnetic core has a saturation magnetic flux density of not less than 1 T.

30. In a magnetic disk device comprising a magnetic disk for recording information, and a thin film magnetic head for performing writing and reading information with respect to said magnetic disk, a magnetic disk device characterized by comprising eight head disk assemblies, each having nine magnetic disks, each having a plane record density of 45~80 mega bits/square inch, mounted on one rotation axis, comprising a magnetic disk rotation means, having said thin film magnetic head in which a pole thickness ($P_T$), a saturation magnetic flux density ($B_s$) of a head core, a magnetic gap depth ($G_d$) and a record wavelength (λ) satisfy, in a range of the record wavelength of 1~2.5 μm, a formula, $$G_d \leq 0.13 \, P_T B_s (\lambda + 4.3) - 2.1,$$

and comprising a container for accommodating said disk assemblies which has four sides one side of a length of 0.5~1.5 m and a height of 2 m or less.

31. A method of writing information into a magnetic disk characterized by rotating a magnetic disk which has a track density of 1500 tracks or more per inch and a line record density of 30 kilo bits or more per inch at a rotation rate of 3500 rpm or more, and writing information at a record wavelength of 1~2.5 μm by using a thin film magnetic head in which a pole thickness ($P_T$), a saturation magnetic flux density ($B_s$) of a head core, a magnetic gap depth ($G_d$) and the record wavelength (λ) satisfy the formula, $$G_d \leq 0.13 \, P_T B_s (\lambda + 4.3) - 2.1.$$

32. A magnetic disk device characterized by comprising a plurality of head disk assemblies, each comprising a plurality of magnetic disks disposed on one rotation axis, each magnetic disk having a track density of 1500~3000 tracks per inch and a line record density of 30~50 kilo bits per inch, comprising a thin film magnetic head in which a pole thickness ($P_T$), a saturation magnetic flux density ($B_s$) of a head core, a magnetic gap depth ($G_d$) and a record wavelength (λ) satisfy the formula $$G_d \leq 0.13 \, P_T B_s (\lambda + 4.3) - 2.1,$$

and comprising said magnetic disk rotation means.

33. A magnetic disk device comprising a head-disk assembly including a magnetic disk, having a plane record density more than 45 mega bits per square inch and mounted on a rotation axis, for recording information, a thin film magnetic head for carrying out writing and reading information with respect to said magnetic disk, means for rotating said magnetic disk and means for driving said thin film magnetic head with respect to said magnetic disk, said thin film magnetic head comprising a substrate, a pair of magnetic film cores formed on said substrate, a coil made of a thin conductor and interposed between said magnetic film cores to form a plurality of coil turns, and an insulator for electrically insulating the coil turns from each other and from said cores, thereby to form a magnetic gap defined by end portions of said cores and a pole tip extending towards a surface of said magnetic disk, wherein a thickness ($P_T$) of said pole tip constituted by said cores and said insulator sandwiched by said cores, a saturation magnetic flux density ($B_s$) of material of said cores, and a magnetic gap depth ($G_d$) ($\mu$m) defined by said pole tip are set to satisfy the following formula:

$$G_d \leq Q\, P_T B_s (\lambda + 4.3) - 2.1,$$

wherein a recording wavelength ($\lambda$) ($\mu$m) is less than 2.5 $\mu$m, and Q is a value in accordance with gap length.

34. A magnetic disk device according to claim 33, wherein Q has a value of 0.13 for a gap length of substantially 0.4 $\mu$m.

35. A magnetic disk device according to claim 34, wherein the value of Q is proportionally increased from 0.13 to be a ratio of a given gap length defined by said cores at said pole tip to the gap length of substantially 0.4 $\mu$m.

36. A magnetic disk device comprising a plurality of head-disk assemblies, each head disk assembly including a magnetic disk, having a plane record density more than 45 mega bits per square inch and mounted on a rotation axis, for recording information, a thin film magnetic head for carrying out writing and reading information with respect to said magnetic disk, means for rotating said magnetic disk, and means for driving said thin film magnetic head with respect to said magnetic disk, said thin film magnetic head comprising a substrate, a pair of magnetic film cores formed on the substrate, a coil made of a thin film conductor and interposed between said magnetic film cores to form a plurality of coil turns, and an insulator for electrically insulating the coil turns from each other and from said cores, thereby to form a magnetic gap defined by end portions of said cores and a pole tip extending towards a surface of said magnetic disk, wherein a thickness ($P_T$) of said pole tip constituted by said cores and said insulator sandwiched by said cores, a saturation magnetic flux density ($B_S$) of material of said cores, and a magnetic gap depth ($G_d$) ($\mu$m) defined by said pole tip are set to satisfy the following formula:

$$G_d \leq Q\, P_T B_s (\lambda + 4.3) - 2.1,$$

where a recording wavelength ($\lambda$) ($\mu$m) is less than 2.5 $\mu$m, and Q is a coefficient having a value in accordance with gap length.

37. A magnetic disk device according to claim 36, wherein Q has a value of 0.13 for a gap length of substantially 0.4 $\mu$m.

38. A magnetic disk device according to claim 37, wherein the value of Q is proportionally increased from 0.13 to be a ratio of a given gap length defined by said cores at said pole tip to the gap length of substantially 0.4 $\mu$m.

* * * * *